3,236,263
DIFFUSER POSITIONING DEVICE
Oscar C. Holderer, Huntsville, Ala., assignor to the United States of America as represented by the Secretary of the Army
Filed Jan. 5, 1962, Ser. No. 164,630
6 Claims. (Cl. 138—45)
(Granted under Title 35, U.S. Code (1952), sec. 266)

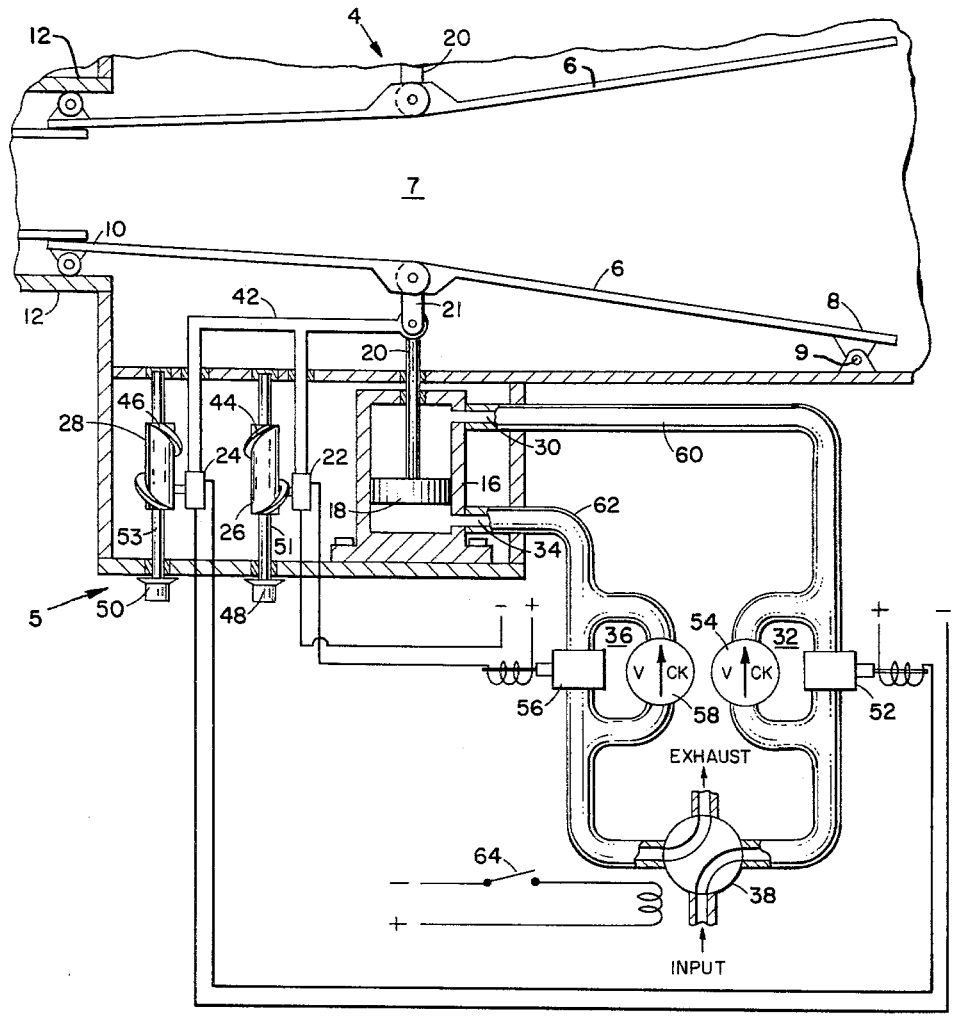

The invention described herein may be manufactured and used by or for the Government for governmental purposes without the payment of royalty thereon.

This invention relates to wind tunnels and more particularly to a device for adjusting the walls of the diffuser section of a wind tunnel.

While running tests on models in wind tunnels, it is desirable to rapidly adjust the throat in the diffuser section of the tunnel in order to accomplish a more economical operation. An adjustable diffuser of high aerodynamic efficiency serves to increase the economy of a wind tunnel system by recovering the pressure of the spent air.

In view of these facts an object of this invention is to provide a device for adjusting the walls of the diffuser section of a wind tunnel.

Another object of the invention is to provide a positioning device for diffusers which are subjected to large forces associated with the air flow through the diffusers.

A further object is to provide a positioning device for rapidly adjusting the walls of a diffuser section of a wind tunnel between discrete adjustable limits.

The foregoing and other objects of this invention will become more fully apparent from the following detailed description of the invention and from the accompanying drawings, in which:

FIGURE 1 is an elevational view, partially in section, of the diffuser section of a wind tunnel with a positioning device coupled to its walls.

FIGURE 2 is a schematic diagram showing the positioning device and the wind tunnel.

In the drawings, wherein for the purpose of illustration there is shown a preferred embodiment of the invention, the numeral 4, FIGURE 1, designates the diffuser section of a wind tunnel comprising a stationary wall 12, a pair of movable diffuser walls 6, a diffuser throat section 7 defined therebetween the walls, each of the movable walls having a flared pivoted end 8 and a second end 10 slidably engaged with the stationary wall of the wind tunnel.

Each of the diffuser walls is provided with a novel positioning apparatus 5 for controlling the movement thereof, wherein adjustments may be effected as desired. While only one positioning apparatus, i.e., that used to control lower wall 6, is shown in detail in the lower portion of FIGURE 1, it is to be understood that upper wall 6 is provided with an identical positioning means, see FIGURE 2. Thus, since the structural arrangement and operation is the same for the positioning apparatus for each wall, the following description will be limited, for simplification, to a single positioning apparatus, e.g., that shown in detail in FIGURE 1, for adjusting the lower diffuser wall.

In order to adjust the movable walls of the diffuser, each wall is provided with a double-acting hydraulic cylinder 16 having a force transmitting means including a piston rod 20 pivotally attached to a coupling rod 21 which is connected to the movable wall of the diffuser for moving the walls 6 and thereby varying the size of the throat 7 of the diffuser which is mounted adjacent the wind tunnel, a pair of microswitches 22 and 24 operatively connected with piston rod 20 for movement with said piston rod; a pair of cylindrical members 26 and 28 rotatably attached to stationary wall 12 of the wind tunnel and adjacent microswitches 22 and 24, respectively, for opening and closing the microswitches at predetermined points, valve means 32 for controlling the flow of hydraulic fluid to and from a first port 30 of the cylinder, valve means 36 for controlling the flow of hydraulic fluid to and from a second port 34 of the cylinder, and a four way valve 38 for selectively supplying fluid to the first or second port of the cylinder.

The wall 6 of the diffuser preferably is comprised of two plates hinged together at throat 7. One end 8 of the diffuser wall is hinged at point 9 to the stationary wind tunnel wall while the other end 10 is slidably engaged with the wind tunnel wall so that the size of throat 7 can be varied when the piston is actuated by fluid pressure, thus, causing coupling rod 21 to effect movement of the diffuser wall either in ad irection towards the diffuser wall or in a direction away from the diffuser wall.

Hydraulic cylinder 16 has its base connected to the stationary wall of the wind tunnel, and its piston provides a complete seal with the wall of the cylinder so that it can be hydraulically locked in a selected position.

Microswitches 22 and 24 are attached to piston rod 20 by means of bar 42 for movement with the piston when it is displaced axially within cylinder 16. The microswitches are disposed adjacent cylindrical members 26 and 28 and are closed when they come in contact, as explained below, with the helical ridges 44 and 46 on members 26 and 28, respectively.

Cylindrical members 26 and 28 are rotatably attached to the stationary wall of the wind tunnel so that they can be rotated to change the point at which the microswitches come in contact with helical ridges 44 and 46. Calibrated knobs 48 and 50 are connected to the cylindrical members by means of rods 51 and 53 and are disposed for rotation to set the points at which the microswitches and helical ridges come into contact.

Valve means 32 comprises a two-way solenoid operated valve 52 and a check valve 54 which is always open to fluid flow toward the cylinder and closed to fluid flow away from the cylinder. Solenoid operated valve 52 is normally open, however, it will be closed responsive to closing of microswitch 24 which causes the valve's associated solenoid to be energized by the supply of power interconnecting microswitch 24 and the solenoid portion of the valve.

Valve means 36 which comprises a normally open solenoid operated valve 56 and a check valve 58 operates in the same manner as valve means 32. However, solenoid valve 56 is closed upon closing of microswitch 22.

Four way valve 38 is connected to two conduits 60 and 62 for selectively controlling the flow of hydraulic fluid to and from the ports 30 and 34. The valve is solenoid operated and upon energization of its solenoid it changes position from that shown to a position where the fluid from the input source (not shown) is supplied to conduit 62.

FIGURE 2 shows in schematic form the wind tunnel and the connection of a four way valve 38 with a plurality of hydraulic cylinders. The valves 32 and 36 are controlled in the same manner as the valves 32 and 36 of FIGURE 1.

The operation of the device is as follows:

Before the fluid is supplied to the input of the wind tunnel, the diffuser throat is in the open position and knobs 48 and 50 have been rotated to set the points at which microswitches 22 and 24 will come into contact with the helical ridges 44 and 46. When the fluid is allowed to flow in the wind tunnel and it reaches the proper velocity, switch 64 is closed, thereby closing the circuit to the solenoid operated four way valve 38 moving valve 38 to the position which allows fluid to flow through normally open, one way valve 58 and normally open valve 56 thus causing the supply of hydraulic fluid to be connected to conduit 62. The hydraulic fluid flows into the cylinder via port 34 causing the piston and the microswitches to be displaced in the upward direction, i.e., in a direction towards the diffuser. Since the piston rod is coupled to movable diffuser wall 6 in the throat of the diffuser by the connecting rod, the diffuser throat is to constricted preselected point set by knob 50. This takes place because microswitch 24 is displaced with the piston until it comes in contact with helical ridge 46 wherein switch 24 is closed. The closing of microswitch 24 causes the solenoid associated with normally open valve 52 to be energized thereby closing conduit 60 to fluid flow from the cylinder via port 30. The closing of conduit 60 traps the hydraulic fluid in the cylinder and thereby stops the piston from further movement in a direction towards the diffuser and hydraulically locks it in this position so long as a predetermined, positive pressure is maintained within the cylinder on the opposite side of the piston via port 34 and conduit 62.

After the test has been run and it is desired to open the throat of the diffuser, switch 64 is opened, thereby opening the circuit to the solenoid operated four way valve 38 and thus causing the supply of hydraulic fluid to be connected to conduit 60 as shown in FIGURE 1. The hydraulic fluid flows through valve 54 only into port 30 displacing the piston and the microswitches carried thereby in a direction away from the diffuser section. This opens microswitch 24 and, consequently, valve 52, and microswitch 22 is closed by helical ridge 44. The closing of microswitch 22 causes solenoid valve 56 to be closed which in turn hydraulically locks the piston in place against further movement in the direction away from the diffuser, so long as a positive, predetermined pressure is maintained on the opposite side of the piston via port 30 and conduit 60.

It can be seen from the above discussed operation that if it is desired to control the displacement of the piston in only one direction, for example, the upward direction, i.e., towards the diffuser, cam 26, microswitch 22, and valves means 36 can be removed.

Further, while the described manner of hydraulically locking the piston in a selected position, i.e., by trapping the fluid on one side of the piston and maintaining a positive, higher fluid pressure on the other side, is preferred, it is apparent that other convenient means may be employed. For example, the arrangement could be such that both valve means, 32 and 36, could be simultaneously closed at a predetermined time so as to trap hydraulic fluid on both sides of the piston, thus, locking the piston.

It is to be understood that the form of the invention that is herein shown and described is the preferred embodiment, and that various changes in shape, size and arrangement of parts may be resorted to without departing from the spirit of the invention or the scope of the subjoined claims.

I claim:
1. In a wind tunnel having a diffuser section, a pair of movable diffuser walls disposed within said diffuser section defining a diffuser throat therebetween, each of said walls having a positioning apparatus for controlling the movement thereof, said apparatus comprising:
 (a) a stationary plate positioned adjacent said diffuser section;
 (b) an hydraulic cylinder positioned on said plate, said cylinder having a first port adjacent one end thereof and a second port adjacent the opposite end thereof;
 (c) a piston disposed for axial movement within said cylinder, said piston being adapted to form a complete seal with the interior wall of said cylinder;
 (d) a force transmitting means having one end attached to said piston and the other end pivotally connected with said movable wall;
 (e) a first conduit connected in fluid communication with said first port for allowing fluid to flow into said cylinder so as to cause movement of said piston in a first direction;
 (f) a second conduit connected in fluid communications with said second port for allowing fluid flow from said cylinder;
 (g) valve means positioned in said second conduit for opening and closing said second conduit;
 (h) a microswitch operatively connected for movement with said force transmitting means;
 (i) a source of power connected to said microswitch;
 (j) means for closing said microswitch; and
 (k) means connected in series with said microswitch for closing said valve means responsive to closing of said microswitch thereby hydraulically preventing further movement of said piston in said first direction within said cylinder.
2. The device as set forth in claim 1 wherein said means (j) for closing said microswitch comprises:
 (a) a cylindrical member, said cylindrical member being rotatably disposed on said stationary plate and positioned adjacent said microswitch so that said microswitch is adapted to engage said member responsive to displacement of said piston;
 (b) a helical ridge mounted on said member for closing said microswitch when said microswitch comes in contact with said helical ridge; and
 (c) a knob attached to one end of said cylindrical member for rotating said member and for changing the point at which the microswitch and said helical ridge come into contact.
3. The device as set forth in claim 2 wherein said means ((k) of claim 1) connected in series with said microswitch for closing said valve means comprises:
 (a) a solenoid.
4. In a wind tunnel having a diffuser section, a pair of movable diffuser walls disposed within said diffuser section and defining a throat therebetween, each of said walls having a positioning apparatus for controlling the movement thereof, said apparatus comprising:
 (a) a stationary plate;
 (b) a hydraulic cylinder mounted on said plate;
 (c) said cylinder having a first port adjacent one end thereof and a second port adjacent the other end thereof;
 (d) a piston disposed within said hydraulic cylinder, said piston being adapted to form a complete seal with the wall of the cylinder;
 (e) a force transmitting means having one end operatively connected to said piston and the other end operatively connected to the movable wall whose movement is being controlled;
 (f) a first conduit having one end attached to said first port;
 (g) a second conduit having one end attached to said second port;
 (h) a four-way valve coupled to the other ends of said first and second conduits;
 (i) first valve means positioned in said first conduit;
 (j) second valve means positioned in said second conduit;
 (k) a first microswitch operatively connected to said force transmitting means;
 (l) a second microswitch operatively connected to said force transmitting means;
 (m) means for selectively closing said first microswitch;
 (n) means for selectively closing said second microswitch;
 (o) means connected in series with said first microswitch for closing said first valve means responsive to closing of said first microswitch thereby hydraulically locking said piston from further movement in a first direction within said cylinder; and
 (p) means connected in series with said second microswitch for closing said second valve means respon- sive to closing said second microswitch thereby hydraulically locking said piston from further movement in a second direction within said cylinder.

5. The device as set forth in claim 4 wherein said means (m) for selectively closing said first microswitch comprising:
   (a) a first cylindrical member, said first cylindrical member being rotatably disposed on said stationary plate and positioned adjacent said first microswitch so that said first microswitch is adapted for engagement with said first member responsive to displacement of said piston; and
   (b) a first helical ridge mounted on said first member for closing said first microswitch when said first microswitch comes in contact with said first helical ridge.

6. The device as set forth in claim 5 wherein said means ((n) of claim 4) for selectively closing said second microswitch comprises:
   (a) a second cylindrical member, said cylindrical member being rotatably disposed on said stationary plate and positioned adjacent said second microswitch so that said second microswitch is adapted for engagement with said second member responsive to displacement of said piston; and
   (b) a second helical ridge mounted on said second member for closing said second microswitch when said second microswitch comes in contact with said second helical ridge.

References Cited by the Examiner
UNITED STATES PATENTS

| | | | |
|---|---|---|---|
| 2,625,008 | 1/1953 | Crook | 138—45 X |
| 2,788,020 | 4/1957 | Davie | 138—45 |
| 2,791,240 | 5/1957 | Storms et al. | 138—45 |
| 2,855,902 | 10/1958 | Ballmer | 121—41 |
| 2,984,217 | 5/1961 | Cline | 121—41 |
| 3,065,599 | 11/1962 | Dew | 138—45 X |

LAVERNE D. GEIGER, *Primary Examiner.*

DAVID SCHONBERG, LEWIS J. LENNY, *Examiners.*

H. ARTIS, *Assistant Examiner.*